UNITED STATES PATENT OFFICE.

CHARLES C. MAY, OF CANON CITY, COLORADO.

ELASTIC CEMENT.

No. 826,180.      Specification of Letters Patent.      Patented July 17, 1906.

Application filed February 3, 1906. Serial No. 299,351.

*To all whom it may concern:*

Be it known that I, CHARLES C. MAY, a citizen of the United States, residing at Canon City, in the county of Fremont and State of Colorado, have invented certain new and useful Improvements in Elastic Cement, of which the following is a specification.

The object of my invention is to provide an improved composition of matter consisting of an elastic cement for use in repairing roofs or gutters of any character, for the joints or seams of furnaces, boiler-heads, water tanks and troughs, or skylights, pipes, or troughs of any construction, for use generally in repairing cast iron or steel articles of any description, and which will be durable and well adapted to withstand the action of the elements and all atmospheric conditions.

My improved composition of matter consists of the following ingredients—namely, coal-tar, asphaltum, magnesia, asbestos fiber, Portland cement, white lead, lampblack, rosin, and alum.

The preferred proportions of the parts of the various ingredients above named are as follows: pure distilled coal-tar, one-half gallon; pure asphaltum, one quart; magnesia asbestos fiber, three pounds; Portland cement, one-half pound; dry white lead, one-half pound; dry lampblack, one-fourth pound; rosin, pulverized, one-fourth pound; alum, pulverized, three ounces.

The various ingredients producing my improved composition of matter may be mixed thoroughly together by any desired machinery that will produce an elastic cement for the purposes above stated.

My improved cement will not crack, scale, shrink, or peel under any ordinary heat or atmospheric exposure. It is impermeable to water and acids and is characterized by a maximum ability to withstand fire.

Having thus described the invention, what is claimed as new is—

1. The herein-described improved elastic cement consisting of coal-tar, asphaltum, asbestos fiber pulverized, alum and a binder.

2. The herein-described improved composition of matter, consisting of asphaltum, asbestos fiber, Portland cement, white lead, lampblack, rosin and alum.

3. The herein-described composition of matter consisting of the following ingredients in the following proportions: one-half of a gallon of pure distilled coal-tar, one quart of pure asphaltum, three pounds of magnesia asbestos fiber, one-half of a pound of Portland cement, one-half of a pound of dry white lead, one-quarter of a pound of dry lampblack, one quarter of a pound of rosin, pulverized, and three ounces of pulverized alum.

In testimony whereof I affix my signature in presence of two witnesses.

CHARLES C. MAY. [L. S.]

Witnesses:
     T. V. RAGSDALE,
     H. V. WILLIAMSON.